(12) United States Patent
Kuo

(10) Patent No.: US 12,144,041 B2
(45) Date of Patent: Nov. 12, 2024

(54) METHOD AND APPARATUS FOR UE-TO-UE RELAY TRANSMITTING SIDELINK UE INFORMATION IN A WIRELESS COMMUNICATION SYSTEM

(71) Applicant: ASUS Technology Licensing Inc., Taipei (TW)

(72) Inventor: Richard Lee-Chee Kuo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/595,008

(22) Filed: Mar. 4, 2024

(65) Prior Publication Data

US 2024/0306230 A1 Sep. 12, 2024

Related U.S. Application Data

(60) Provisional application No. 63/451,433, filed on Mar. 10, 2023.

(51) Int. Cl.
*H04W 76/14* (2018.01)
*H04W 40/22* (2009.01)
*H04W 72/40* (2023.01)

(52) U.S. Cl.
CPC ......... *H04W 76/14* (2018.02); *H04W 40/22* (2013.01); *H04W 72/40* (2023.01)

(58) Field of Classification Search
CPC ..... H04W 40/22; H04W 72/02; H04W 72/04; H04W 72/12; H04W 72/40; H04W 76/14; H04W 88/04; H04W 8/005; H04W 84/18
See application file for complete search history.

(56) References Cited

U.S. PATENT DOCUMENTS

| 2018/0287689 | A1* | 10/2018 | Lee | H04W 48/16 |
| 2022/0303862 | A1* | 9/2022 | Wu | H04W 40/02 |
| 2022/0338092 | A1 | 10/2022 | Wang | |
| 2022/0361267 | A1 | 11/2022 | Wang | |
| 2023/0053135 | A1 | 2/2023 | Kuo | |
| 2023/0073469 | A1* | 3/2023 | Wang | H04W 40/22 |

* cited by examiner

*Primary Examiner* — Thomas R Cairns
(74) *Attorney, Agent, or Firm* — Blue Capital Law Firm, P.C.

(57) ABSTRACT

A method and device for a UE-to-UE relay are disclosed. In one embodiment, the UE-to-UE relay establishes a first PC5 Radio Resource Control (RRC) connection with a first remote User Equipment (UE) and establishes a second PC5 RRC connection with a second remote UE to support communication between the first remote UE and the second remote UE via the UE-to-UE relay. The UE-to-UE relay also transmits a first RRC message to a network node to request sidelink transmission resource, wherein the first RRC message includes an identity (ID) of the first remote UE and at least one of following information: a destination ID of the second remote UE, an ID of a Sidelink (SL) Data Radio Bearer (DRB), a third ID of a PC5 quality of service (QoS) flow, and a PC5 QoS profile of the PC5 QoS flow.

16 Claims, 14 Drawing Sheets

METHOD AND APPARATUS FOR UE-TO-UE RELAY TRANSMITTING SIDELINK UE INFORMATION IN A WIRELESS COMMUNICATION SYSTEM

CROSS-REFERENCE TO RELATED APPLICATIONS

The present Application claims the benefit of U.S. Provisional Patent Application Ser. No. 63/451,433 filed on Mar. 10, 2023, the entire disclosure of which is incorporated herein in its entirety by reference.

FIELD

This disclosure generally relates to wireless communication networks, and more particularly, to a method and apparatus for UE-to-UE relay transmitting sidelink UE information in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a UE-to-UE relay are disclosed. In one embodiment, the UE-to-UE relay establishes a first PC5 Radio Resource Control (RRC) connection with a first remote User Equipment (UE) and establishes a second PC5 RRC connection with a second remote UE to support communication between the first remote UE and the second remote UE via the UE-to-UE relay. The UE-to-UE relay also transmits a first RRC message to a network node to request sidelink transmission resource, wherein the first RRC message includes an identity (ID) of the first remote UE and at least one of following information: a destination ID of the second remote UE, an ID of a Sidelink (SL) Data Radio Bearer (DRB), a third ID of a PC5 quality of service (QoS) flow, and a PC5 QoS profile of the PC5 QoS flow. Furthermore, the UE-to-UE relay receives a second RRC message from the network node, wherein the second RRC message includes the ID of the first remote UE and at least one of following information: the ID of the SL DRB, the third ID of the PC5 QoS flow, and a configuration of a second PC5 Radio Link Control (RLC) channel.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TR 23.700-33 V2.0.0, "Study on system enhancement for Proximity based services (ProSe) in the 5G System (5GS); Phase 2 (Release 18)"; TR 38.836 V17.0.0, "Study on NR sidelink relay (Release 17)"; TS 38.331 V17.3.0, "NR; Radio Resource Control (RRC) protocol specification (Release 17)"; TS 23.304 V18.0.0, "Proximity based Service (ProSe) in the 5G System (5GS) (Release 18)". The standards and documents listed above are hereby expressly incorporated by reference in their entirety.

Figure 1:
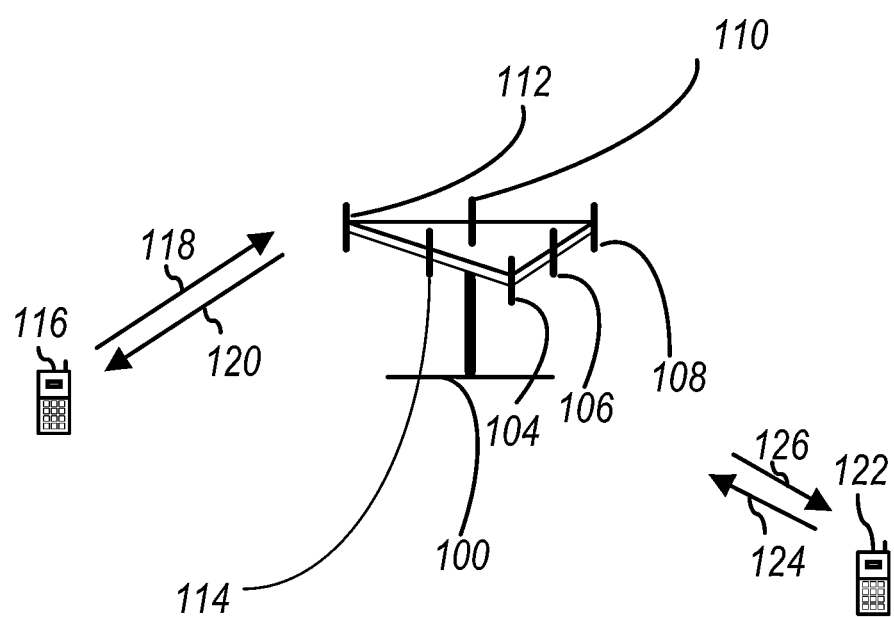
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
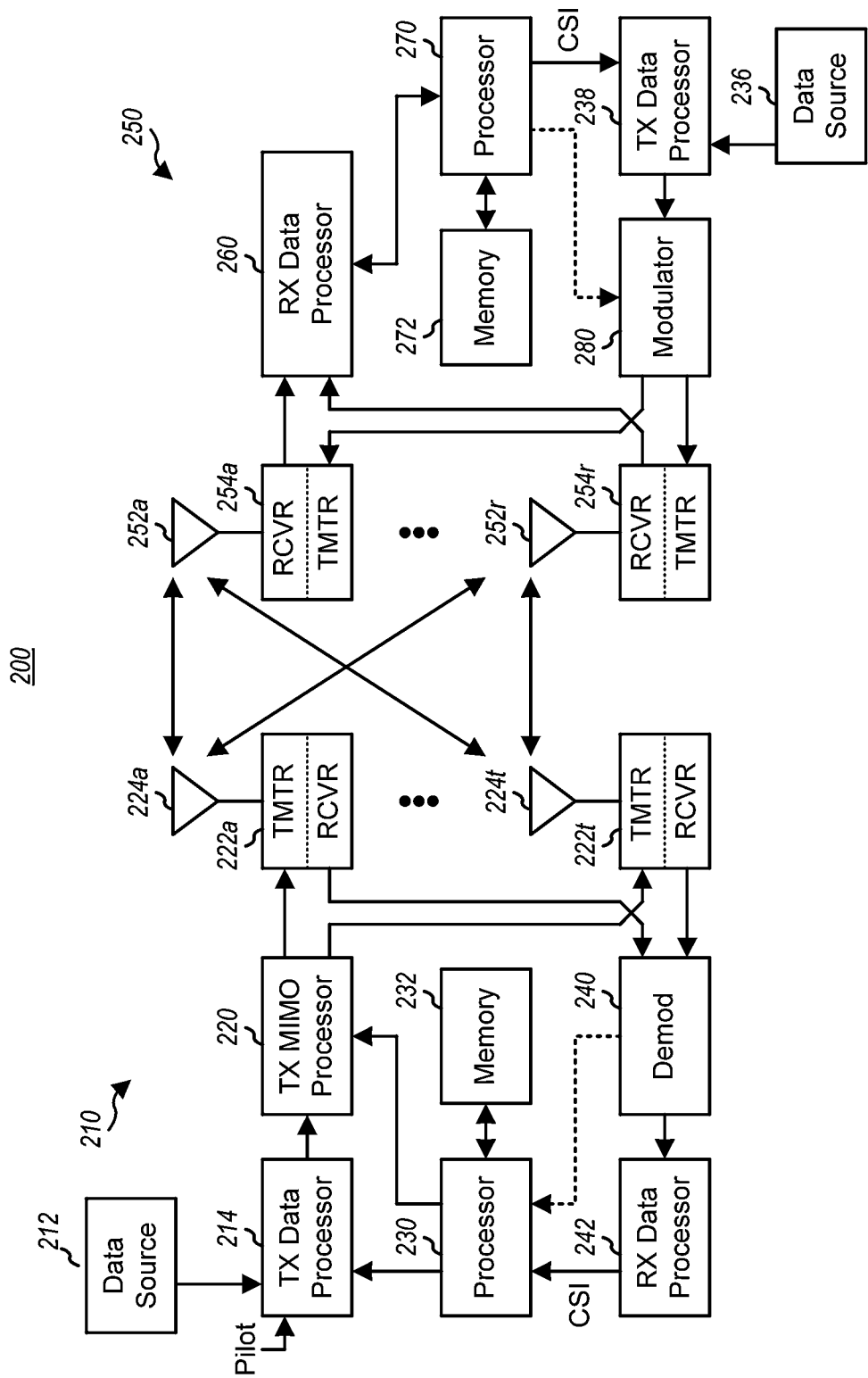
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
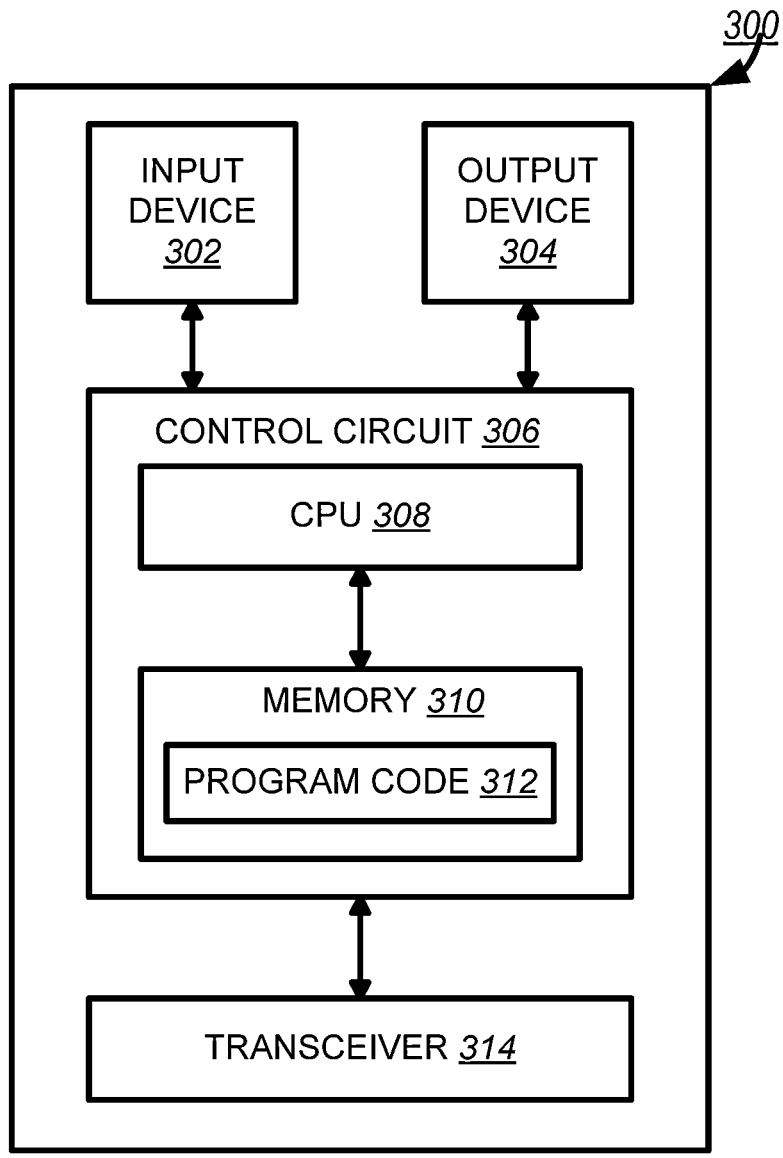
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
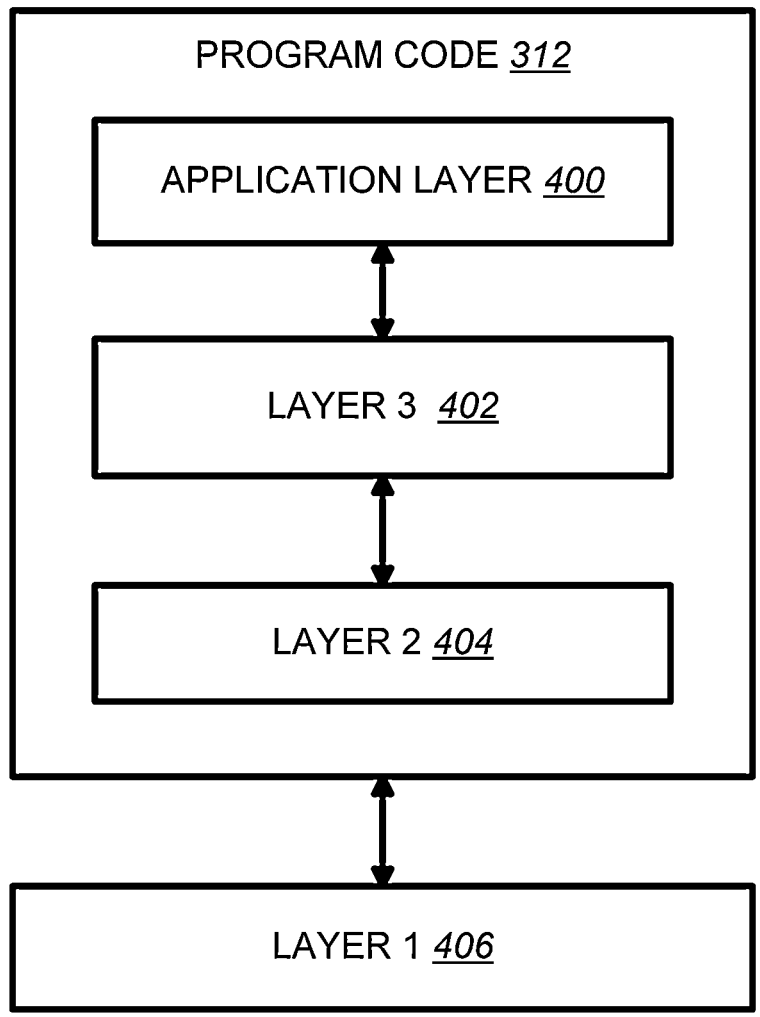
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TR 23.700-33 proposes to support UE-to-UE Relay. The issue description of UE-to-UE Relay and related conclusions are provided below:

5.1 Key Issue #1: Support of UE-to-UE Relay
5.1.1 General Description

Figure 5:
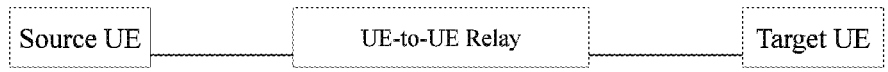
FIG. 5 is a reproduction of Figure 5.1.1-1 of 3GPP TR 23.700-33 V2.0.0.

This key issue intends to support single hop UE-to-UE Relay for unicast as illustrated in figure 5.1.1-1, including support for in coverage and out of coverage operation of Source UE, Target UE as well as the UE-to-UE Relay.

Figure 5.1.1-1 of 3GPP TR 23.700-33 V2.0.0, Entitled "Example Scenario of Support of UE-to-UE Relay", is Reproduced as FIG. 5

At least the following aspects need to be studied in potential solutions:
How to discover UE-to-UE Relay(s) and (re)-select a UE-to-UE Relay UE in proximity.
Whether and how the network can control UE-to-UE Relay operation, at least including how to:
Authorize the UE-to-UE Relay, e.g. authorize a UE as UE-to-UE Relay.
Authorize Source/Target UEs to use a UE-to-UE Relay.
Provisioning policy and parameters for UE-to-UE Relay service.
How to establish the connection between the source UE and the target UE via UE-to-UE Relay.
How to provide end-to-end QoS framework to satisfy the QoS requirements (such as data rate, reliability, latency).
How to enhance the system architecture to provide security/privacy protection for a relayed connection.
How to provide a mechanism for a path changing in the case of e.g. UE-to-UE Relay changes, including reducing communication disruptions and fulfilling QoS requirements.
Whether and how to determine whether Layer-2 UE-to-UE Relay or Layer-3 UE-to-UE Relay or both are supported by the Source, Target and Relay UEs and how to make sure the Source, Target and Relay UE all use the same type of relay.
NOTE 1: The solution should take into account the forward compatibility for supporting more than one hop in a later release.
NOTE 2: For the involvement of NG-RAN, coordination with RAN WGs is needed.
NOTE 3: For security/privacy protection aspects, coordination with SA WG3 is needed.
NOTE 4: This KI covers both Layer-2 and Layer-3 UE-to-UE relay cases.
[ . . . ]

3GPP TS 38.836 specifies Sidelink-based UE-to-UE relay as follows:
5 Sidelink-based UE-to-UE Relay
5.1 Scenario, Assumption and Requirement The UE-to-UE Relay enables the coverage extension of the sidelink transmissions between two sidelink UEs and power saving. The coverage scenarios considered in this study are the following:
1) All UEs (Source UE, Relay UE, Destination UE) are in coverage.
2) All UEs (Source UE, Relay UE, Destination UE) are out-of-coverage.
3) Partial coverage whereby at least one of the UEs involved in relaying (Source UE, Relay UE, Destination UE) is in-coverage, and at least one of the UEs involved in relaying is out-of-coverage.

RAN2 will strive for a common solution to the in- and out-of-coverage cases. For the UE-to-UE Relay, the scenario where UEs can be in coverage of the different cell is supported.

Figure 5.1-1 shows the scenarios considered for UE-to-UE Relay. In Figure 5.1-1, coverage implies that the Source/Destination UE and/or UE-to-UE Relay UE are in coverage and can access the network on Uu.

Figure 6:
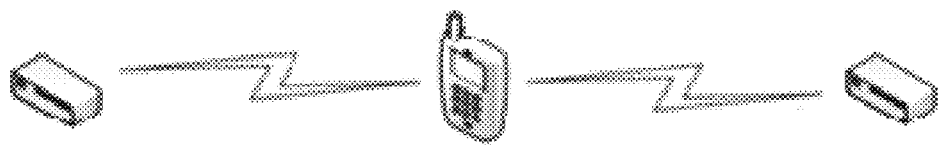
FIG. 6 is a reproduction of Figure 5.1-1 of 3GPP TS 38.836 V17.0.0.

Figure 5.1-1 of 3GPP TS 38.836 V17.0.0, Entitled "Scenarios for UE-to-UE Relay (where the Coverage Status is not Shown)", is Reproduced as FIG. 6

NR sidelink is assumed on PC5 between the Remote UE(s) and the UE-to-UE Relay. Cross-RAT configuration/control of Source UE, UE-to-UE Relay and Destination UE is not considered, i.e., eNB/ng-eNB do not control/configure an NR Source UE, Destination UE or UE-to-UE Relay UE. For UE-to-UE Relay, this study focuses on unicast data traffic between the Source UE and the Destination UE.

Configuring/scheduling of a UE (Source UE, Destination UE or UE-to-UE Relay UE) by the SN to perform NR sidelink communication is out of scope of this study.

For UE-to-UE Relay, it is assumed that the Remote UE has an active end-to-end connection via only a single Relay UE at a given time.

Relaying of data between a Source UE and a Destination UE can occur once a PC5 link is established between the Source UE, UE-to-UE Relay, and Destination UE.

No restrictions are assumed on the RRC states of any UEs involved in UE-to-UE Relaying. The requirement of service continuity is only for UE-to-Network Relay, but not for UE-to-UE Relay, during mobility in this release.
[ . . . ]
5.5 Layer-2 Relay
5.5.1 Architecture and Protocol Stack For L2 UE-to-UE Relay architecture, the protocol stacks are similar to L2 UE-to-Network Relay other than the fact that the termination points are two Remote UEs. The protocol stacks for the user plane and control plane of L2 UE-to-UE Relay architecture are described in Figure 5.5.1-1 and Figure 5.5.1-2.

An adaptation layer is supported over the second PC5 link (i.e. the PC5 link between Relay UE and Destination UE) for L2 UE-to-UE Relay. For L2 UE-to-UE Relay, the adaptation layer is put over RLC sublayer for both CP and UP over the second PC5 link. The sidelink SDAP/PDCP and RRC are terminated between two Remote UEs, while RLC, MAC and PHY are terminated in each PC5 link.

Figure 7:
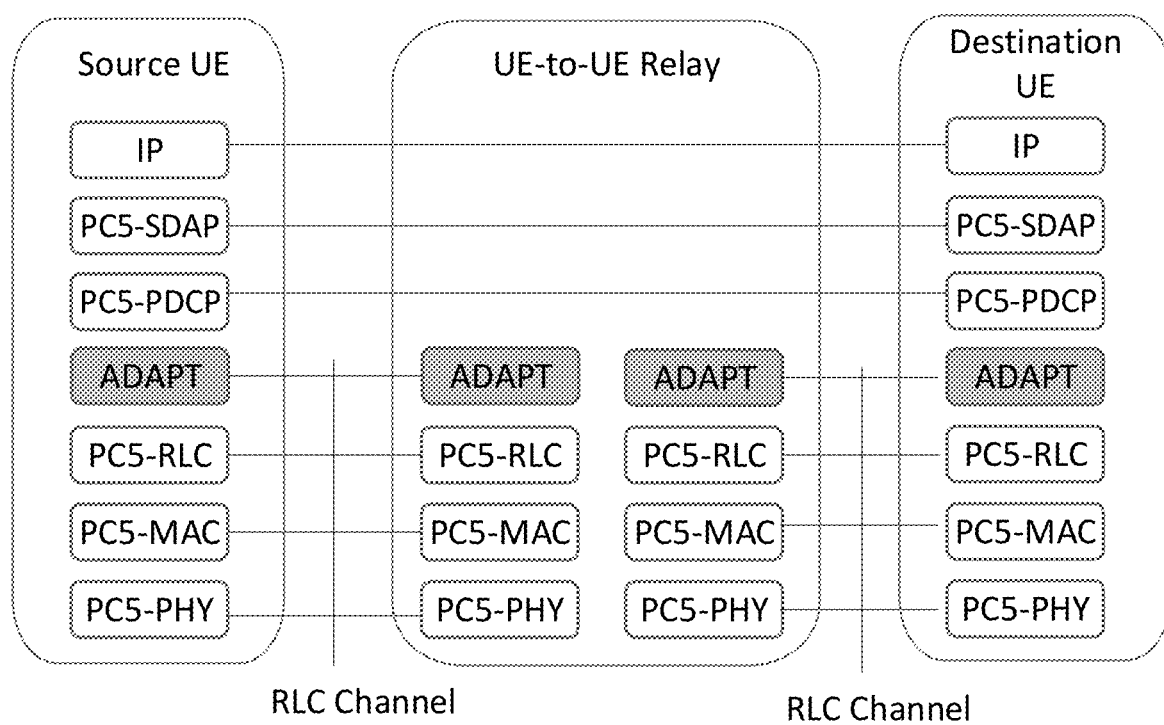
FIG. 7 is a reproduction of Figure 5.5.1-1 of 3GPP TS 38.836 V17.0.0.
Figure 8:
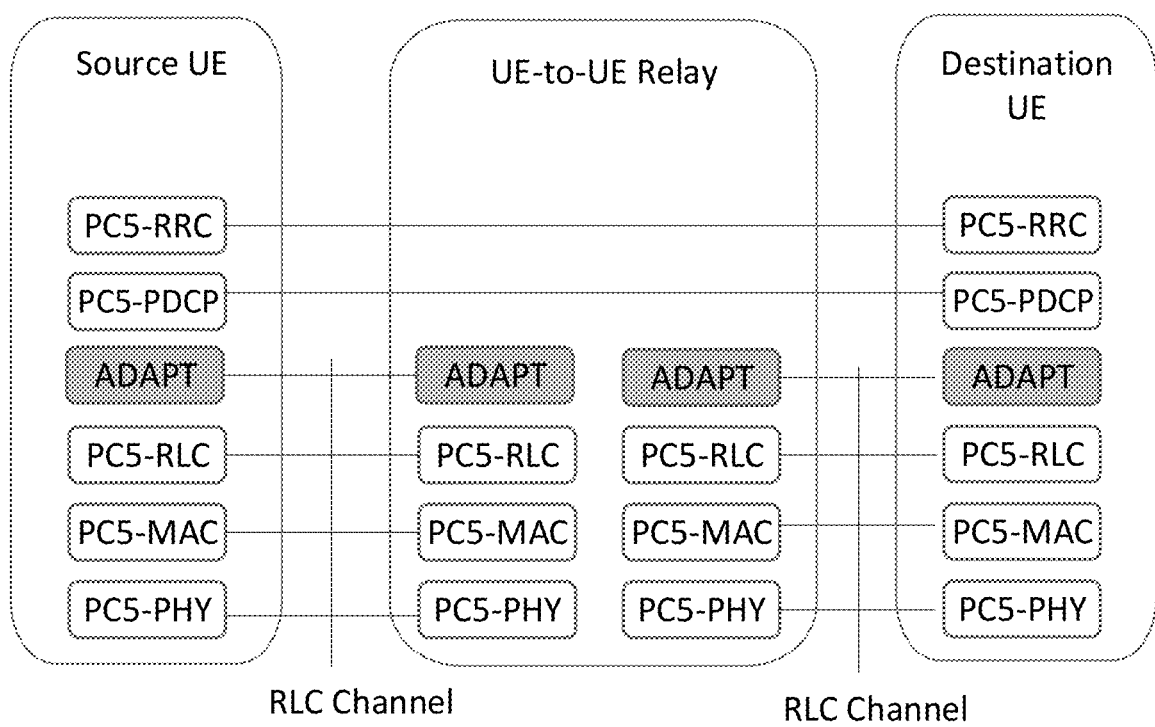
FIG. 8 is a reproduction of Figure 5.5.1-2 of 3GPP TS 38.836 V17.0.0.

> Figure 5.5.1-1 of 3GPP TS 38.836 V17.0.0, Entitled "User Plane Protocol Stack for L2 UE-to-UE Relay", is Reproduced as FIG. 7
>
> Figure 5.5.1-2 of 3GPP TS 38.836 V17.0.0, Entitled "Control Plane Protocol Stack for L2 UE-to-UE Relay", is Reproduced as FIG. 8

For the first hop of L2 UE-to-UE Relay:
The N:1 mapping is supported by first hop PC5 adaptation layer between Remote UE SL Radio Bearers and first hop PC5 RLC channels for relaying.
The adaptation layer over first PC5 hop between Source Remote UE and Relay UE supports to identify traffic destined to different Destination Remote UEs.
For the second hop of L2 UE-to-UE Relay:
The second hop PC5 adaptation layer can be used to support bearer mapping between the ingress RLC channels over first PC5 hop and egress RLC channels over second PC5 hop at Relay UE.
PC5 Adaptation layer supports the N:1 bearer mapping between multiple ingress PC5 RLC channels over first PC5 hop and one egress PC5 RLC channel over second PC5 hop and supports the Remote UE identification function.
For L2 UE-to-UE Relay:
The identity information of Remote UE end-to-end Radio Bearer is included in the adaptation layer in first and second PC5 hop.
In addition, the identity information of Source Remote UE and/or the identity information of Destination Remote UE are candidate information to be included in the adaptation layer, which are to be decided in WI phase.

5.5.2 QoS

QoS handling for L2 UE-to-UE Relay is subject to upper layer, e.g. solution #31 in TR 23.752 studied by SA2.

3GPP TS 38.331 specifies sidelink related Radio Resource Control (RRC) procedures for NR sidelink communication as follows:

5.3.5 RRC Reconfiguration
5.3.5.1 General

Figure 9:
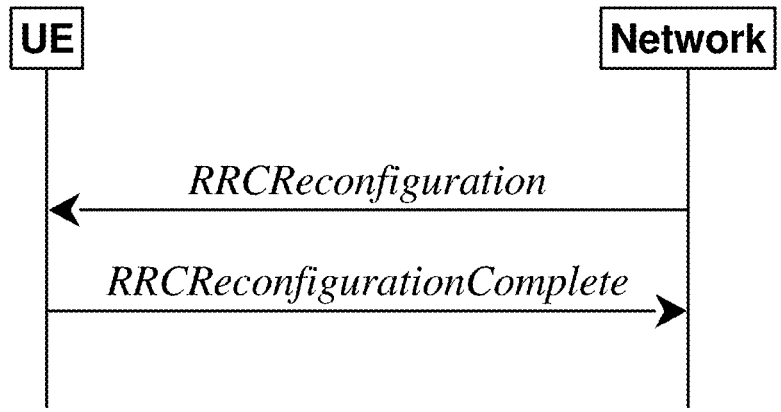
FIG. 9 is a reproduction of Figure 5.3.5.1-1 of 3GPP TS 38.331 V 17.3.0.

> Figure 5.3.5.1-1 of 3GPP TS 38.331 V 17.3.0, Entitled "RRC Reconfiguration, Successful", is Reproduced as FIG. 9

[ . . . ]
The purpose of this procedure is to modify an RRC connection, e.g. to establish/modify/release RBs/BH RLC channels/Uu Relay RLC channels/PC5 Relay RLC channels, to perform reconfiguration with sync, to setup/modify/release measurements, to add/modify/release SCells and cell groups, to add/modify/release conditional handover configuration, to add/modify/release conditional PSCell change or conditional PSCell addition configuration. As part of the procedure, NAS dedicated information may be transferred from the Network to the UE.

RRC reconfiguration to perform reconfiguration with sync includes, but is not limited to, the following cases:
  reconfiguration with sync and security key refresh, involving RA to the PCell/PSCell, MAC reset, refresh of security and re-establishment of RLC and PDCP triggered by explicit L2 indicators;
  reconfiguration with sync but without security key refresh, involving RA to the PCell/PSCell, MAC reset and RLC re-establishment and PDCP data recovery (for AM DRB or AM MRB) triggered by explicit L2 indicators.
  reconfiguration with sync for DAPS and security key refresh, involving RA to the target PCell, establishment of target MAC, and
    for non-DAPS bearer: refresh of security and re-establishment of RLC and PDCP triggered by explicit L2 indicators;
    for DAPS bearer: establishment of RLC for the target PCell, refresh of security and reconfiguration of PDCP to add the ciphering function, the integrity protection function and ROHC function of the target PCell;
    for SRB: refresh of security and establishment of RLC and PDCP for the target PCell;
  reconfiguration with sync for DAPS but without security key refresh, involving RA to the target PCell, establishment of target MAC, and
    for non-DAPS bearer: RLC re-establishment and PDCP data recovery (for AM DRB or AM MRB) triggered by explicit L2 indicators.
    for DAPS bearer: establishment of RLC for target PCell, reconfiguration of PDCP to add the ciphering function, the integrity protection function and ROHC function of the target PCell;
    for SRB: establishment of RLC and PDCP for the target PCell.
  reconfiguration with sync for direct-to-indirect path switch, not involving RA at target side, involving re-establishment of PDCP/PDCP data recovery (for AM DRB) triggered by explicit L2 indicators.

In (NG)EN-DC and NR-DC, SRB3 can be used for measurement configuration and reporting, for UE assistance (re-)configuration and reporting for power savings, for IP address (re-)configuration and reporting for IAB-nodes, to (re-)configure MAC, RLC, BAP, physical layer and RLF timers and constants of the SCG configuration, and to reconfigure PDCP for DRBs associated with the S-$K_{gNB}$ or SRB3, and to reconfigure SDAP for DRBs associated with S-$K_{gNB}$ in NGEN-DC and NR-DC, and to add/modify/release conditional PSCell change configuration, provided that the (re-)configuration does not require any MN involvement, and to transmit RRC messages between the MN and the UE during fast MCG link recovery. In (NG)EN-DC and NR-DC, only measConfig, radioBearerConfig, conditionalReconfiguration, bap-Config, iab-IP-AddressConfigurationList, otherConfig and/or secondaryCellGroup are included in RRCReconfiguration received via SRB3, except when RRCReconfiguration is received within DLInformationTransferMRDC.

5.3.5.2 Initiation

The Network may initiate the RRC reconfiguration procedure to a UE in RRC_CONNECTED. The Network applies the procedure as follows:
  the establishment of RBs (other than SRB1, that is established during RRC connection establishment) is performed only when AS security has been activated;
  the establishment of BH RLC Channels for IAB is performed only when AS security has been activated;
  the establishment of Uu Relay RLC channels and PC5 Relay RLC channels (other than SL-RLC0 and SL-RLC1, that is established before RRC connection establishment) for L2 U2N Relay UE is performed only when AS security has been activated, and the establishment of PC5 Relay RLC channels for L2 U2N Remote UE (other than SL-RLC0 and SL-RLC1, that is established before RRC connection establishment) is performed only when AS security has been activated;

the addition of Secondary Cell Group and SCells is performed only when AS security has been activated;

the reconfigurationWithSync is included in secondary-CellGroup only when at least one RLC bearer or BH RLC channel is setup in SCG;

the reconfigurationWithSync is included in masterCell-Group only when AS security has been activated, and SRB2 with at least one DRB or multicast MRB or, for IAB, SRB2, are setup and not suspended;

the conditionalReconfiguration for CPC is included only when at least one RLC bearer is setup in SCG;

the conditionalReconfiguration for CHO or CPA is included only when AS security has been activated, and SRB2 with at least one DRB or multicast MRB or, for IAB, SRB2, are setup and not suspended.

Figure 10:
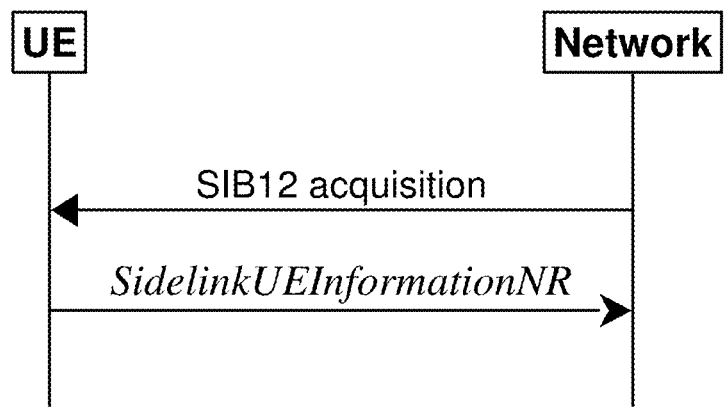
FIG. 10 is a reproduction of Figure 5.8.3.1-1 of 3GPP TS 38.331 V 17.3.0.

5.8.3 Sidelink UE Information for NR Sidelink Communication/Discovery
5.8.3.1 General Figure 5.8.3.1-1 of 3GPP TS 38.331 V 17.3.0, Entitled "Sidelink UE Information for NR Sidelink Communication/Discovery", is Reproduced as FIG. 10

The purpose of this procedure is to inform the network that the UE:
- is interested or no longer interested to receive or transmit NR sidelink communication/discovery,
- is requesting assignment or release of transmission resource for NR sidelink communication/discovery,
- is reporting QoS parameters and QoS profile(s) related to NR sidelink communication,
- is reporting that a sidelink radio link failure or sidelink RRC reconfiguration failure has been detected,
- is reporting the sidelink UE capability information of the associated peer UE for unicast communication,
- is reporting the RLC mode information of the sidelink data radio bearer(s) received from the associated peer UE for unicast communication,
- is reporting the accepted sidelink DRX configuration received from the associated peer UE for NR sidelink unicast reception,
- is reporting the sidelink DRX assistance information received from the associated peer UE for NR sidelink unicast transmission, when the UE is configured with sl-ScheduledConfig,
- is reporting, for NR sidelink groupcast transmission, the sidelink DRX on/off indication for the associated Destination Layer-2 ID,
- is reporting, for NR sidelink groupcast or broadcast reception, the Destination Layer-2 ID and QoS profile(s) associated with its interested services to which sidelink DRX is applied,
- is reporting DRX configuration reject information from its associated peer UE for NR sidelink unicast transmission, when the UE is configured with sl-ScheduledConfig,
- is reporting parameters related to U2N relay operation.

5.8.3.2 Initiation

A UE capable of NR sidelink communication or NR sidelink discovery or NR sidelink U2N relay operation that is in RRC_CONNECTED may initiate the procedure to indicate it is (interested in) receiving or transmitting NR sidelink communication or NR sidelink discovery or NR sidelink U2N relay operation in several cases including upon successful connection establishment or resuming, upon change of interest, upon changing QoS profiles, upon receiving UECapabilityInformationSidelink from the associated peer UE, upon RLC mode information updated from the associated peer UE or upon change to a PCell providing SIB12 including sl-ConfigCommonNR. A UE capable of NR sidelink communication may initiate the procedure to request assignment of dedicated sidelink DRB configuration and transmission resources for NR sidelink communication transmission. A UE capable of NR sidelink communication may initiate the procedure to report to the network that a sidelink radio link failure or sidelink RRC reconfiguration failure has been declared. A UE capable of NR sidelink discovery may initiate the procedure to request assignment of dedicated resources for NR sidelink discovery transmission or NR sidelink discovery reception. A UE capable of U2N relay operation may initiate the procedure to report/update parameters for acting as U2N Relay UE or U2N Remote UE (including L2 Remote UE's source L2 ID).

A UE capable of NR sidelink operation that is in RRC_CONNECTED may initiate the procedure to report the sidelink DRX configuration received from the associated peer UE for NR sidelink unicast reception, upon accepting the sidelink DRX configuration from the associated peer UE. A UE capable of NR sidelink communication that is in RRC_CONNECTED and is performing sidelink unicast transmission with resource allocation mode 1 may initiate the procedure to report the sidelink DRX assistance information or the sidelink DRX configuration reject information received from the associated peer UE, upon receiving either of them from the associated peer UE. A UE capable of NR sidelink communication that is performing sidelink groupcast transmission may initiate the procedure to report the sidelink DRX on/off indication for the associated Destination Layer-2 ID.

A UE capable of NR sidelink operation that is in RRC_CONNECTED may initiate the procedure to report the Destination Layer-2 ID and QoS profile associated with its interested services that sidelink DRX is applied, for NR sidelink groupcast or broadcast reception.

[ . . . ]

5.8.9.1 Sidelink RRC Reconfiguration
5.8.9.1.1 General

Figure 11:
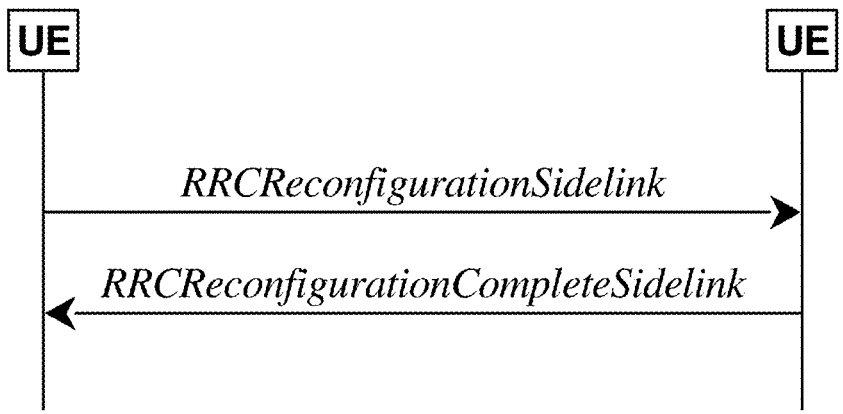
FIG. 11 is a reproduction of Figure 5.8.9.1.1-1 of 3GPP TS 38.331 V 17.3.0.

Figure 5.8.9.1.1-1 of 3GPP TS 38.331 V 17.3.0, Entitled "Sidelink RRC Reconfiguration, Successful", is Reproduced as FIG. 11

[ . . . ]

The purpose of this procedure is to modify a PC5-RRC connection, e.g. to establish/modify/release sidelink DRBs or PC5 Relay RLC channels, to (re-)configure NR sidelink measurement and reporting, to (re-)configure sidelink CSI reference signal resources, to (re)configure CSI reporting latency bound, to (re)configure sidelink DRX, and to (re-)configure the latency bound of SL Inter-UE coordination report.

The UE may initiate the sidelink RRC reconfiguration procedure and perform the operation in clause 5.8.9.1.2 on the corresponding PC5-RRC connection in following cases:

the release of sidelink DRBs associated with the peer UE, as specified in clause 5.8.9.1a.1;

the establishment of sidelink DRBs associated with the peer UE, as specified in clause 5.8.9.1a.2;

the modification for the parameters included in SLRB-Config of sidelink DRBs associated with the peer UE, as specified in clause 5.8.9.1a.2;

the release of PC5 Relay RLC channels for L2 U2N Relay UE and Remote UE, as specified in clause 5.8.9.7.1;

the establishment of PC5 Relay RLC channels for L2 U2N Relay UE and Remote UE, as specified in clause 5.8.9.7.2;

the modification for the parameters included in SL-RLC-ChannelConfigPC5 of PC5 Relay RLC channels for L2 U2N Relay UE and Remote UE, as specified in clause 5.8.9.7.2;

the (re-)configuration of the peer UE to perform NR sidelink measurement and report.

the (re-)configuration of the sidelink CSI reference signal resources and CSI reporting latency bound;

the (re-)configuration of the peer UE to perform sidelink DRX;

the (re-)configuration of the latency bound of SL Inter-UE coordination report.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

[ . . . ]

6.2.2 Message Definitions

[ . . . ]

SidelinkUEInformationNR

The SidelinkUEinformationNR message is used for the indication of NR sidelink UE information to the network.

```
[...]
SidelinkUEInformationNR-v1700-IEs ::= SEQUENCE {
    sl-TxResourceReqList-v1700          SL-TxResourceReqList-v1700
OPTIONAL,
    sl-RxDRX-ReportList-v1700           SL-RxDRX-ReportList-v1700
OPTIONAL,
    sl-RxInterestedGC-BC-DestList-r17   SL-RxInterestedGC-BC-DestList-r17
OPTIONAL,
    sl-RxInterestedFreqListDisc-r17     SL-InterestedFreqList-r16
OPTIONAL,
    sl-TxResourceReqListDisc-r17        SL-TxResourceReqListDisc-r17
OPTIONAL,
    sl-TxResourceReqListCommRelay-r17   SL-TxResourceReqListCommRelay-r17
OPTIONAL,
    ue-Type-r17                         ENUMERATED {relayUE, remoteUE}
OPTIONAL,
    sl-SourceIdentityRemoteUE-r17       SL-SourceIdentity-r17
OPTIONAL,
    nonCriticalExtension                SEQUENCE { }
OPTIONAL
}
[...]
SL-TxResourceReqList-r16 ::=          SEQUENCE (SIZE (1..maxNrofSL-Dest-r16) ) OF SL-
TxResourceReq-r16
SL-TxResourceReq-r16 ::=              SEQUENCE {
    sl-DestinationIdentity-r16            SL-DestinationIdentity-r16,
    sl-CastType-r16                       ENUMERATED {broadcast, groupcast, unicast, spare1},
    sl-RLC-ModeIndicationList-r16         SEQUENCE (SIZE (1..maxNrofSLRB-r16) ) OF SL-RLC-
Mode Indication-r16       OPTIONAL,
    sl-QoS-InfoList-r16                   SEQUENCE (SIZE (1..maxNrofSL-QFIsPerDest-r16) ) OF SL-
QoS-Info-r16           OPTIONAL,
    sl-TypeTxSyncList-r16                 SEQUENCE (SIZE (1..maxNrofFreqSL-r16) ) OF SL-
TypeTxSync-r16             OPTIONAL,
    sl-TxInterestedFreqList-r16           SL-TxInterestedFreqList-r16
OPTIONAL,
    sl-CapabilityInformationSidelink-r16  OCTET STRING
OPTIONAL
}
[...]
SL-QoS-Info-r16 ::=                   SEQUENCE {
    sl-QoS-FlowIdentity-r16               SL-QoS-FlowIdentity-r16,
    sl-QoS-Profile-r16                    SL-QoS-Profile-r16
OPTIONAL
}
[...]
```

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

```
[...]
RRCReconfiguration-v1610-IEs ::=    SEQUENCE {
    otherConfig-v1610               OtherConfig-v1610
OPTIONAL, -- Need
    bap-Config-r16                  SetupRelease { BAP-Config-r16 }
OPTIONAL, -- Need M
    iab-IP-AddressConfigurationList-r16     IAB-IP-AddressConfigurationList-r16
OPTIONAL, -- Need M
    conditionalReconfiguration-r16  ConditionalReconfiguration-r16
OPTIONAL, -- Need M
    daps-SourceRelease-r16          ENUMERATED{true}
OPTIONAL, -- Need M
    t316-r16                        SetupRelease {T316-r16}
OPTIONAL, -- Need M
    needForGapsConfigNR-r16         SetupRelease {NeedForGapsConfigNR-r16}
OPTIONAL, -- Need M
    onDemandSIB-Request-r16         SetupRelease { OnDemandSIB-Request-r16 }
OPTIONAL, -- Need M
    dedicatedPosSysInfoDelivery-r16     OCTET STRING (CONTAINING PosSystemInformation-r16-
IEs)            OPTIONAL, -- Need N
    sl-ConfigDedicatedNR-r16        SetupRelease {SL-ConfigDedicatedNR-r16}
OPTIONAL, -- Need M
    sl-ConfigDedicatedEUTRA-Info-r16    SetupRelease {SL-ConfigDedicatedEUTRA-Info-r16}
OPTIONAL, -- Need M
    targetCellSMTC-SCG-r16          SSB-MTC
OPTIONAL, -- Need S
    nonCriticalExtension            RRCReconfiguration-v1700-IEs
OPTIONAL
}
RRCReconfiguration-v1700-IEs ::=    SEQUENCE {
    otherConfig-v1700               OtherConfig-v1700
OPTIONAL, -- Need M
    sl-L2RelayUE-Config-r17         SetupRelease { SL-L2RelayUE-Config-r17 }
OPTIONAL, -- Need M
    sl-L2RemoteUE-Config-r17        SetupRelease { SL-L2RemoteUE-Config-r17 }
OPTIONAL, -- Need M
    dedicatedPagingDelivery-r17     OCTET STRING (CONTAINING Paging)
OPTIONAL, -- Cond PagingRelay
    needForGapNCSG-ConfigNR-r17     SetupRelease {NeedForGapNCSG-ConfigNR-r17}
OPTIONAL, -- Need M
    needForGapNCSG-ConfigEUTRA-r17  SetupRelease {NeedForGapNCSG-ConfigEUTRA-r17}
OPTIONAL, -- Need M
    musim-GapConfig-r17             SetupRelease {MUSIM-GapConfig-r17}
OPTIONAL, -- Need M
    ul-GapFR2-Config-r17            SetupRelease { UL-GapFR2-Config-r17 }
OPTIONAL, -- Need M
    scg-State-r17                   ENUMERATED { deactivated }
OPTIONAL, -- Need N
    appLayerMeasConfig-r17          AppLayerMeasConfig-r17
OPTIONAL, -- Need M
    ue-TxTEG-RequestUL-TDOA-Config-r17  SetupRelease { UE-TxTEG-RequestUL-TDOA-Config-r17}
OPTIONAL, -- Need M
    nonCriticalExtension            SEQUENCE { }
OPTIONAL
}
[...]
```

SL-ConfigDedicatedNR

The IE SL-ConfigDedicatedNR specifies the dedicated configuration information for NR sidelink communication.

```
SL-ConfigDedicatedNR-r16 ::=        SEQUENCE {
    sl-PHY-MAC-RLC-Config-r16       SL-PHY-MAC-RLC-Config-r16
    OPTIONAL,       -- Need M
        sl-RadioBearerToReleaseList-r16     SEQUENCE (SIZE (1..maxNrofSLRB-r16) ) OF SLRB-Uu-
ConfigIndex-r16         OPTIONAL,   -- Need N
        sl-RadioBearerToAddModList-r16      SEQUENCE (SIZE (1..maxNrofSLRB-r16) ) OF SL-
RadioBearerConfig-r16       OPTIONAL,   -- Need N
```

```
    sl-MeasConfigInfoToReleaseList-r16    SEQUENCE (SIZE (1..maxNrofSL-Dest-r16) ) OF SL-
DestinationIndex-r16    OPTIONAL,    -- Need N
    sl-MeasConfigInfoToAddModList-r16    SEQUENCE (SIZE (1..maxNrofSL-Dest-r16) ) OF SL-
MeasConfigInfo-r16    OPTIONAL,    -- Need N
    t400-r16                              ENUMERATED {ms100, ms200, ms300, ms400, ms600, ms1000,
ms1500, ms2000} OPTIONAL,    -- Need M
    ...,
    [[
    sl-PHY-MAC-RLC-Config-v1700          SetupRelease { SL-PHY-MAC-RLC-Config-v1700 }
OPTIONAL,    -- Need M
    sl-DiscConfig-r17                    SetupRelease { SL-DiscConfig-r17}
OPTIONAL    -- Need M
    ]]
}
[...]
```

SL-RadioBearerConfig
The IE SL-RadioBearerConfig specifies the sidelink DRB configuration information for NR sidelink communication.

```
SL-RadioBearerConfig-r16 ::=    SEQUENCE {
    slrb-Uu-ConfigIndex-r16         SLRB-Uu-ConfigIndex-r16,
    sl-SDAP-Config-r16              SL-SDAP-Config-r16
OPTIONAL,    -- Cond SLRBSetup
    sl-PDCP-Config-r16              SL-PDCP-Config-r16
OPTIONAL,    -- Cond SLRBSetup
    sl-TransRange-r16               ENUMERATED {m20, m50, m80, m100, m120, m150, m180, m200,
m220, m250, m270, m300, m350, m370,
                                                m400, m420, m450, m480, m500, m550, m600, m700,
m1000, spare9, spare8, spare7, spare6,
                                                spare5, spare4, spare3, spare2, spare1}
OPTIONAL,    -- Need R
    ...
}
``` slrb-Uu-ConfigIndex
This field indicates the index of sidelink DRB configuration.
[ ... ]

6.6.2 Message Definitions
[ ... ]
RRCReconfigurationSidelink
The RRCReconfigurationSidelink message is the command to AS configuration of the PC5 RRC connection. It is only applied to unicast of NR sidelink communication.

```
RRCReconfigurationSidelink-r16-IEs ::= SEQUENCE {
    slrb-ConfigToAddModList-r16      SEQUENCE (SIZE (1..maxNrofSLRB-r16) ) OF SLRB-Config-
r16          OPTIONAL, -- Need N
    slrb-ConfigToReleaseList-r16     SEQUENCE (SIZE (1..maxNrofSLRB-r16) ) OF SLRB-PC5-
ConfigIndex-r16    OPTIONAL, -- Need N
    sl-MeasConfig-r16                SetupRelease {SL-MeasConfig-r16}
OPTIONAL, -- Need M
    sl-CSI-RS-Config-r16             SetupRelease {SL-CSI-RS-Config-r16}
OPTIONAL, -- Need M
    sl-ResetConfig-r16               ENUMERATED {true}
OPTIONAL, -- Need N
    sl-LatencyBoundCSI-Report-r16    INTEGER (3..160)
OPTIONAL, -- Need M
    lateNonCriticalExtension         OCTET STRING
OPTIONAL,
    nonCriticalExtension             RRCReconfigurationSidelink-v1700-IEs
OPTIONAL
}
[...]
SLRB-Config-r16::=            SEQUENCE {
    slrb-PC5-ConfigIndex-r16        SLRB-PC5-ConfigIndex-r16,
    sl-SDAP-ConfigPC5-r16           SL-SDAP-ConfigPC5-r16
OPTIONAL, -- Need M
```

| | |
|---|---|
| sl-PDCP-ConfigPC5-r16 | SL-PDCP-ConfigPC5-r16 |
| OPTIONAL, -- Need M | |
| sl-RLC-ConfigPC5-r16 | SL-RLC-ConfigPC5-r16 |
| OPTIONAL, -- Need M | |
| sl-MAC-LogicalChannelConfigPC5-r16 | SL-LogicalChannelConfigPC5-r16 |
| OPTIONAL, -- Need N | |
| ... | |
| } | |

3GPP TS 23.304 specifies QoS handling for 5G ProSe UE-to-UE Relay operations as follows:

5.6.3 QoS Handling for 5G ProSe UE-to-UE Relay Operations 5.6.3.1 QoS Handling for 5G ProSe Layer-3 UE-to-UE Relay For a 5G ProSe Layer-3 End UE connecting with another 5G ProSe Layer-3 End UE(s) via 5G ProSe Layer-3 UE-to-UE Relay, the QoS requirement of the relay traffic between the peer 5G ProSe Layer-3 End UE(s) can be satisfied by the corresponding QoS control for the PC5 link between source 5G ProSe Layer-3 End UE and 5G ProSe Layer-3 UE-to-UE Relay (i.e. first hop PC5 QoS control) and the QoS control for the PC5 link between 5G ProSe Layer-3 UE-to-UE Relay and target 5G ProSe Layer-3 End UE (i.e. second hop PC5 QoS control). The first hop PC5 QoS and second hop PC5 QoS is controlled with PC5 QoS rules and PC5 QoS parameters (e.g. PQI, GFBR, MFBR, PC5 LINK-AMBR) as specified in clause 5.6.1.

As shown in figure 5.6.3.1-1 below, the end-to-end QoS is met only when the QoS requirements are properly translated and satisfied over the two legs respectively.

Figure 12:
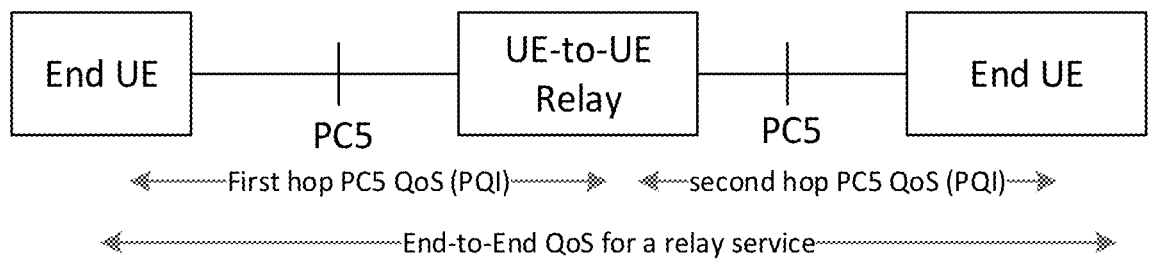
FIG. 12 is a reproduction of Figure 5.6.3.1-1 of 3GPP TS 23.304 V18.0.0.

Figure 5.6.3.1-1 of 3GPP TS 23.304 V18.0.0, Entitled "End-to-End QoS for 5G ProSe Layer-3 UE-to-UE Relay Operation", is Reproduced as FIG. 12

To achieve this, the source 5G ProSe Layer-3 End UE initiates PC5 QoS Flows setup or modification during the Layer-2 link establishment or modification procedure, the source 5G ProSe Layer-3 End UE provides the QoS Info as described in clause 6.4.3.7.3 to the 5G ProSe Layer-3 UE-to-UE Relay. The received PC5 QoS parameters of the QoS Info (i.e. PQI and conditionally other parameters such as MFBR/GFBR, etc.) are interpreted as the end-to-end QoS requirements by the 5G ProSe Layer-3 UE-to-UE Relay for the traffic transmission between source 5G ProSe Layer-3 End UE and target 5G ProSe Layer-3 End UE. The 5G ProSe Layer-3 UE-to-UE Relay, based on its implementation, decides the PQI for the first hop PC5 QoS control and the PQI for the second hop PC5 QoS control. The 5G ProSe Layer-3 UE-to-UE Relay provides the QoS Info (including PQI value chosen by the 5G ProSe Layer-3 UE-to-UE Relay for the second hop) to the target 5G ProSe Layer-3 End UE, and provides the QoS Info (including PQI value chosen by the 5G ProSe Layer-3 UE-to-UE Relay for the first hop) to the source 5G ProSe Layer-3 End UE. If the source 5G ProSe Layer-3 End UE performs the Layer-2 link modification procedure to add new PC5 QoS Flow(s) or modify the existing PC5 QoS Flow(s) for IP traffic or Ethernet traffic over PC5 reference point, the source 5G ProSe Layer-3 End UE may also provide the PC5 QoS Rule(s) for the PC5 QoS Flow(s) to be added or modified to the 5G ProSe Layer-3 UE-to-UE Relay. The 5G ProSe Layer-3 UE-to-UE Relay may generate the Packet Filters used over the second hop based on the received PC5 QoS Rule(s).

5.6.3.2 QoS Handling for 5G ProSe Layer-2 UE-to-UE Relay

For a 5G ProSe Layer-2 End UE connecting with another 5G ProSe Layer-2 End UE(s) via 5G ProSe Layer-2 UE-to-UE Relay, the source 5G ProSe Layer-2 End UE and the target 5G ProSe Layer-2 End UE negotiate the end-to-end QoS for the traffic transmission between source 5G ProSe Layer-2 End UE and target 5G ProSe Layer-2 End UE.

Editor's note: It is FFS whether and how to perform QoS enforcement for first hop PC5 interface (between the source 5G ProSe Layer-2 End UE and 5G ProSe Layer-2 UE-to-UE Relay) and second hop PC5 interface (between the 5G ProSe Layer-2 UE-to-UE Relay and the target 5G ProSe Layer-2 End UE).

Key issue #1 in 3GPP TR 23.700-33 describes support of UE-to-UE Relay (in Release 18), which means a Relay UE may be used to support communication between two UEs in case these two UEs cannot communicate with each other directly due to beyond radio coverage. The Relay UE needs to establish one PC5 unicast link or PC5 (RRC) connection with each of a Source UE (e.g. the first PC5 hop) and a Target UE (e.g. the second PC5 hop). In addition, an end-to-end (E2E) PC5 unicast link between the Source UE and the Target UE may be established between the Source UE and the Target UE. It is noted that both terms "PC5" and "SL" in this disclosure may be used interchangeably.

Figure 5.5.1-1 (reproduced as FIG. 7) and Figure 5.5.1-2 (reproduced as FIG. 8) of 3GPP TR 38.836 describe the protocol stacks for the user plane and control plane of L2 UE-to-UE Relay architecture, each of which includes an adaptation layer to support multiple Source UEs to communicate with one Target UE via a UE-to-UE Relay and one Source UE to communicate with multiple Target UEs via the UE-to-UE Relay. 3GPP TR 38.836 further specifies an identity information of (Remote UE) E2E Radio Bearer is included in the header of the adaptation layer Protocol Data Unit (PDU) in first and second PC5 hop. In addition, the identity information (e.g. a local ID) of Source Remote UE and/or the identity information of Target Remote UE are candidate information to be included in the header of the adaptation layer PDU. The identity information of Source Remote UE and/or the identity information of Target Remote UE is/are needed in the header if packets from different Source Remote UEs are allowed to be multiplexed into the same PC5 Radio Link Control (RLC) channel over the first PC5 hop and/or packets to different Target Remote UEs are allowed to be multiplexed into the same PC5 RLC channel over the second PC5 hop.

Thus, when transmitting an adaptation layer PDU on the PC5 RLC channel over the first PC5 hop, the Source UE may need to include information (e.g. a local ID of the Target UE) in a header of the adaptation layer PDU to identify the Target UE so that the UE-to-UE Relay can forward a data packet (or Packet Data Convergence Protocol (PDCP) PDU) included in the adaptation layer PDU to the Target UE on the right PC5 RLC channel (or RLC bearer) over the second PC5 hop because separate PC5 RLC channels may be established for communication between the UE-to-UE Relay and different Target UEs.

Figure 13:
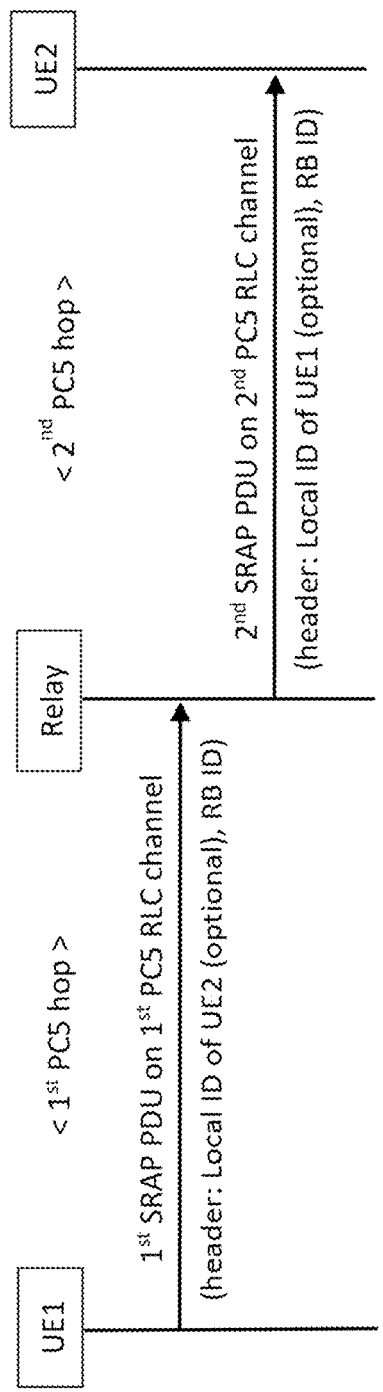
FIG. 13 illustrates data/message forwarding via UE-to-UE Relay according to one exemplary embodiment.

In addition to the identity information of the Target UE, an ID of the end-to-end Radio Bearer included in the header by the Source UE may also be used by the UE-to-UE Relay to determine the PC5 RLC channel over the second PC5 hop. It may not be necessary for the header to include information to identify the Source UE because the L2 ID of the Source UE is included in the lower layer PDU (i.e. in a header of a Medium Access Control (MAC) PDU). On the other hand, the UE-to-UE Relay may need to include information (e.g. a local ID of the Source UE) to identify the Source UE in a header of the adaptation layer PDU sent to the Target UE so that the Target UE can deliver the data packet included in the adaptation layer PDU to the right PC5 PDCP entity because separate PC5 PDCP entities are established in the Target UE for different Source UEs. The end-to-end Radio Bearer (RB) ID may also be included in the header of the adaptation layer PDU by the UE-to-UE Relay. It may not be necessary for the header to include information to identify the Target UE. FIG. 13, which shows data/message forwarding via UE-to-UE Relay, illustrates an example of the above concepts. However, it is also feasible to include the local IDs of both the Source UE and the Target UE in the adaptation layer PDU sent by the Source UE or by the UE-to-UE Relay.

To fulfil the above concept, a remote UE needs to know the local ID, used in the adaptation layer, of the other remote UE when communicating with the other remote UE via a UE-to-UE relay, while the UE-to-UE relay needs to know the local IDs of both remote UEs. It doesn't seem necessary for the remote UE to know its own local ID. In addition, each local ID of the remote UEs may be unique within the scope of the UE-to-UE Relay. Therefore, the UE-to-UE Relay may assign or allocate the local ID for each remote UE and then provides the local ID of one remote UE to the other remote UE. It is also feasible for the relay UE to provide both local IDs to both remote UEs.

As described above, when receiving an adaptation layer PDU from the Source UE on a first PC5 RLC channel over the first PC5 hop, the UE-to-UE Relay needs to determine a second PC5 RLC channel over the second PC5 hop for transmitting the data packet (or PDCP PDU) included in the adaptation layer PDU to the Target UE according to at least an end-to-end RB ID. The local ID of the Source UE and/or the local ID of the Target UE may also be used for determining the second PC5 RLC channel because the same end-to-end RB ID may be used by different Source-Target UE pairs. In this situation, the UE-to-UE Relay needs to maintain a mapping between end-to-end Radio Bearers and second PC5 RLC channels.

Basically, when a new PC5 Quality of Service (QoS) flow with a PC5 QoS profile is created, the Source UE may send a Sidelink UE Information message to its serving gNB to request a Sidelink Radio Bearer (SLRB) configuration for a SL DRB to which the new PC5 QoS flow is mapped. When following the legacy way (e.g. R17 sidelink) to set the content, the Sidelink UE Information message may include a destination ID of the UE-to-UE relay, a first ID of the PC5 QoS flow (e.g. sl-QoS-FlowIdentity), a first PC5 QoS profile of the PC5 QoS flow, and/or a cast type of "unicast". The gNB may then reply a RRC Reconfiguration message with the SLRB configuration, which may include a sidelink (SL) Service Data Adaptation Protocol (SDAP) configuration, a SL PDCP configuration, an Sidelink Relay Adaptation Protocol (SRAP) configuration, a SL RLC configuration, and/or a SL logical channel configuration, wherein the SL RLC configuration and the SL logical channel configuration may be included in a SL RLC bearer configuration associated with a first PC5 RLC bearer or a first PC5 RLC channel over the first PC5 hop. The Source UE may assign or allocate a RB ID for the SL DRB and then transmit a RRC Reconfiguration Sidelink message to the UE-to-UE relay, wherein the RRC Reconfiguration Sidelink message may include the RB ID, a second ID of the PC5 QoS flow (e.g. sl-PQFI), and/or the first PC5 RLC channel/bearer configuration.

The RRC Reconfiguration Sidelink message may also include an end-to-end PC5 QoS profile of the PC5 QoS flow for the UE-to-UE relay UE to determine a second PC5 QoS profile over the second hop. The RRC Reconfiguration Sidelink message may not include the end-to-end PC5 QoS profile if the upper layers in the remote UEs and the UE-to-UE relay have negotiated the PC5 QoS profiles over the first hop and the second hop for the PC5 QoS flow beforehand e.g. via a Layer-2 link modification procedure. It is noted that combination of the first PC5 QoS profile over the first hop and the second PC5 QoS profile over the first hop may achieve the end-to-end PC5 QoS profile of the PC5 QoS flow between the Source remote UE and the Target remote UE. Alternatively, the Source remote UE may provide the second PC5 QoS profile over the second hop to the UE-to-UE relay directly. The second PC5 QoS profile may be determined by the Source remote UE or the gNB serving the Source remote UE. In addition, it is also feasible for gNB to assign the RB ID for the SL DRB and send it to the Source UE together with the SLRB configuration.

After receiving the RRC Reconfiguration Sidelink message from the Source UE to configure the first PC5 RLC channel over the first PC5 hop, the UE-to-UE relay may send a Sidelink UE Information message to its serving gNB to request a configuration for the second PC5 RLC channel over the second PC5 hop, wherein the Sidelink UE Information message may include a destination ID of the Target UE, a third ID of the PC5 QoS flow (e.g. sl-QoS-FlowIdentity), the second PC5 QoS profile of the PC5 QoS flow, and/or a cast type of "unicast" if the legacy way is followed to set the content of this Sidelink UE Information message.

It is also possible for the UE-to-UE relay to send the Sidelink UE Information message to request a configuration after receiving a SRAP PDU from the Source remote UE on the first PC5 RLC channel over the first PC5 hop. In response to reception of the Sidelink UE Information message, the gNB will reply with a RRC Reconfiguration message, which may include the third ID of the PC5 QoS flow and the second PC5 RLC channel/bearer configuration. An identity (ID) of the second PC5 RLC channel may be assigned by the UE-to-UE relay or included in the RRC Reconfiguration (e.g. in the second PC5 RLC channel/bearer configuration) to identify the second PC5 RLC channel.

It is noted that although the second ID of the PC5 QoS flow (e.g. sl-PQFI) included in the RRC Reconfiguration Sidelink message may be different from the first ID or the third ID of the PC5 QoS flow (e.g. sl-QoS-FlowIdentity) included in the Sidelink UE Information message due to different scopes or ranges for signalling used in the PC5 interface and the Uu interface (e.g. SL-PQFI::= INTEGER (1 . . . 64) and SL-QoS-FlowIdentity::=INTEGER (1 . . . 2048)), they refer to the same PC5 QoS flow. SL-PQFI is unique per Source-Target UE pair, while SL-QoS-FlowIdentity is unique per Source UE in terms of multiple Target UEs. It is also possible that same term of ID is used for both interfaces i.e. the first/third ID of the PC5 QoS flow is equal to the second ID of the PC5 QoS flow (e.g. SL-QoS-FlowIdentity is used for both PC5 and Uu interfaces).

With the above information, the UE-to-UE relay may establish or create a SL RB to PC5 (SL) RLC channel mapping for the Source-Target UE pair based on at least the RB ID and the second PC5 RLC channel ID so that the UE-to-UE relay can determine the right PC5 RLC channel over the second PC5 hop for transmitting the data packet to the Target UE according to at least the (end-to-end) RB ID included in a header of the adaptation layer PDU. The mapping indicates at least a relationship between the RB ID and the second PC5 RLC channel ID. It is noted that there may be multiple end-to-end RBs established between each Source-Target UE pair and thus multiple such mappings may be established to indicate the relationships between the RB IDs and the PC5 RLC channel IDs.

In the previous solution, the relay UE needs to count on the association between a PC5 QoS flow and a PC5 RLC channel, which is not a usual way. Alternatively, the relay UE (or UE-to-UE Relay) may include the RB ID of the SL DRB in the Sidelink UE Information message sent to gNB so that gNB can indicate the mapping relationship between the SL DRB and the PC5 RLC Channel configured to the relay UE in the RRC Reconfiguration message.

According to the above concepts, when a new PC5 QoS flow with a PC5 QoS profile is created, the Source remote UE may send a Sidelink UE Information message to its serving gNB to request a SLRB configuration for a SL DRB to which the new PC5 QoS flow is mapped. In R17 sidelink, the Sidelink UE Information message may include a destination ID of the UE-to-UE relay (because the destination of the first PC5 RLC channel over the first PC5 hop is the UE-to-UE relay), a first ID of the PC5 QoS flow (e.g. sl-QoS-FlowIdentity), a first PC5 QoS profile of the PC5 QoS flow, and/or a cast type of "unicast". Since a Source remote UE in R18 UE-to-UE Relay may communicate with multiple Target remote UEs via the UE-to-UE Relay and different Target remote UEs may use the same PC5 QoS flow ID for different PC5 QoS flows (each of them is associated with one Target remote UE) because PC5 QoS flow ID is unique per Source-Target UE pair according to 3GPP TS 23.287, there is a need for the Source remote UE to include information in the Sidelink UE Information message to indicate the Target remote UE so as to distinguish PC5 QoS flows associated with different Target remote UEs. IN one embodiment, the RRC Reconfiguration message from the gNB may also include the information indicating the Target remote UE so that the Source remote UE can know the PC5 QoS flow of which Target remote UE is mapped to the SLRB configuration (or the SL DRB), especially when multiple PC5 QoS flows associated with different Target remote UEs are created during the same period. In one embodiment, the information indicating the Target remote UE may be a L2 ID or a local ID of the Target remote UE.

Figure 14:
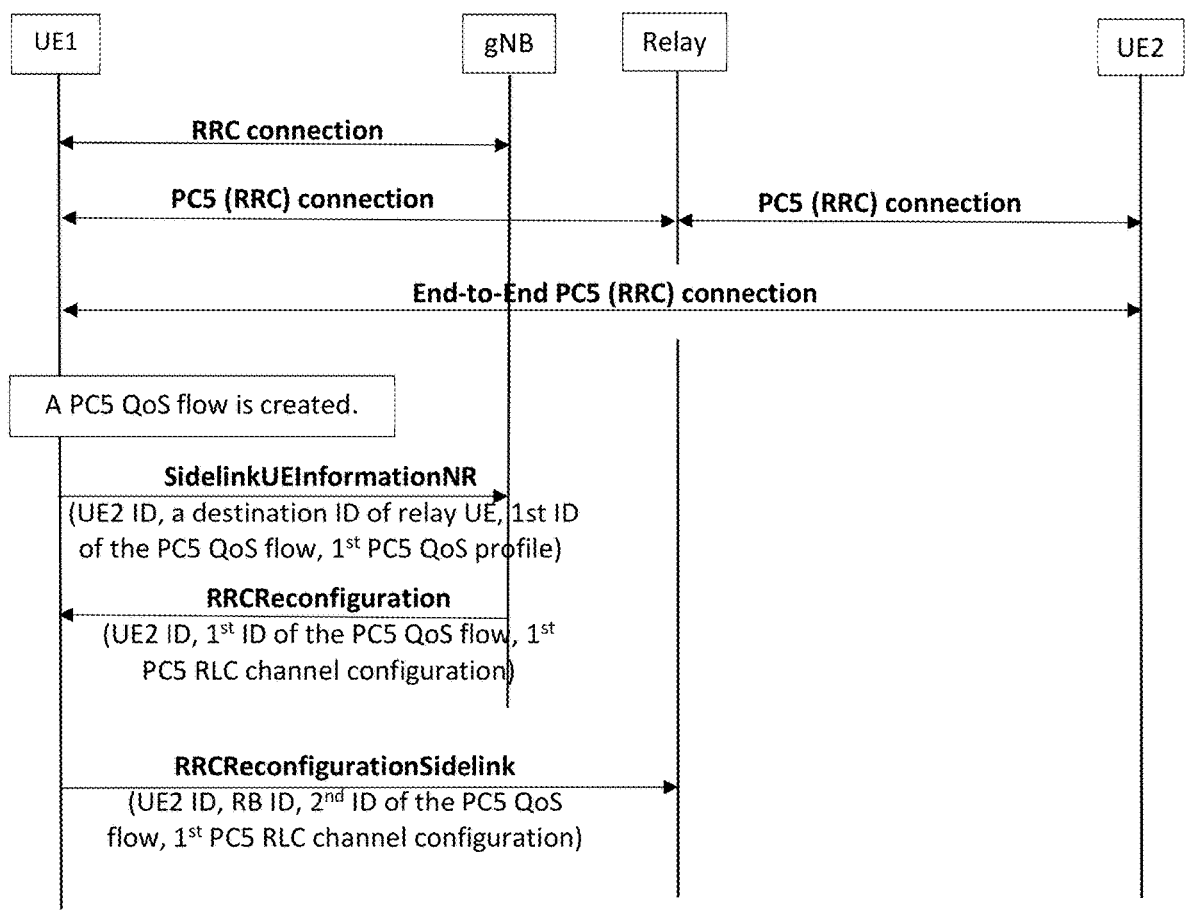
FIG. 14 illustrates sidelink UE information from the Source remote UE according to one exemplary embodiment.

FIG. 14, which shows sidelink UE information from the Source remote UE, illustrates an example of this solution. Basically, the Source remote UE establishes a RRC connection with its serving gNB. And, the relay UE establishes one PC5 (RRC) connection (or PC5 unicast link) with each of the Source remote UE (UE1) and the Target remote UE (UE2). In addition, an end-to-end (E2E) PC5 connection between UE1 and UE2 may be established. When a new PC5 QoS flow is created, UE1 sends a Sidelink UE Information message to request a SLRB configuration, from its serving gNB, for a SL DRB to which the new PC5 QoS flow is mapped. The Sidelink UE Information message may include a destination ID of the relay UE, a first ID and a first PC5 QoS profile of the new PC5 QoS flow, and/or a UE2 ID. In response, the gNB may reply with a RRC Reconfiguration message, which may include the first ID of the new PC5 QoS flow, the UE2 ID, and/or a configuration of a first PC5 RLC channel. UE1 may then transmit a RRC Reconfiguration Sidelink message to configure the first PC5 RLC channel over the first PC5 hop for the relay UE, wherein the RRC Reconfiguration Sidelink message may include a RB ID, a second ID of the PC5 QoS flow, the UE2 ID, and/or a configuration of the first RLC channel. In one embodiment, the UE2 ID may be a L2 ID or a local ID of the Target remote UE.

When receiving the RRC Reconfiguration Sidelink message from a Source remote UE to configure the first PC5 RLC channel over the first PC5 hop, the UE-to-UE relay may send a Sidelink UE Information message to its serving gNB to request a configuration for the second PC5 RLC channel over the second PC5 hop, wherein the Sidelink UE Information message may include a destination ID of the Target remote UE, a third ID of the PC5 QoS flow (e.g. sl-QoS-FlowIdentity), a second PC5 QoS profile of the PC5 QoS flow, and/or a cast type of "unicast" if the legacy way is followed to set the content of this Sidelink UE Information message. Since multiple Source remote UEs in R18 UE-to-UE Relay may communicate with one Target remote UE via the UE-to-UE Relay and different Source remote UEs may use the same PC5 QoS flow ID for different PC5 QoS flows (each of them is associated with one Source remote UE) because PC5 QoS flow ID is unique per Source-Target UE pair according to 3GPP TS 23.287, there is a need for the UE-to-UE relay to include information in the Sidelink UE Information message to indicate the Source remote UE so as to distinguish PC5 QoS flows associated with different Source remote UEs.

It is also possible for the UE-to-UE relay to send the Sidelink UE Information message to request a configuration after receiving a SRAP PDU from the Source remote UE on the first PC5 RLC channel over the first PC5 hop. In one embodiment, the RRC Reconfiguration message from the gNB to the UE-to-UE relay may also include the information indicating the Source remote UE so that the UE-to-UE relay can know the PC5 QoS flow/the SL DRB of which Source remote UE is mapped to the second PC5 RLC channel over the second hop especially when multiple PC5 QoS flows associated with different Source remote UEs are created during the same configuration period. Preferably, the information indicating the Source remote UE may be a L2 ID or a local ID of the Source remote UE.

Figure 15:
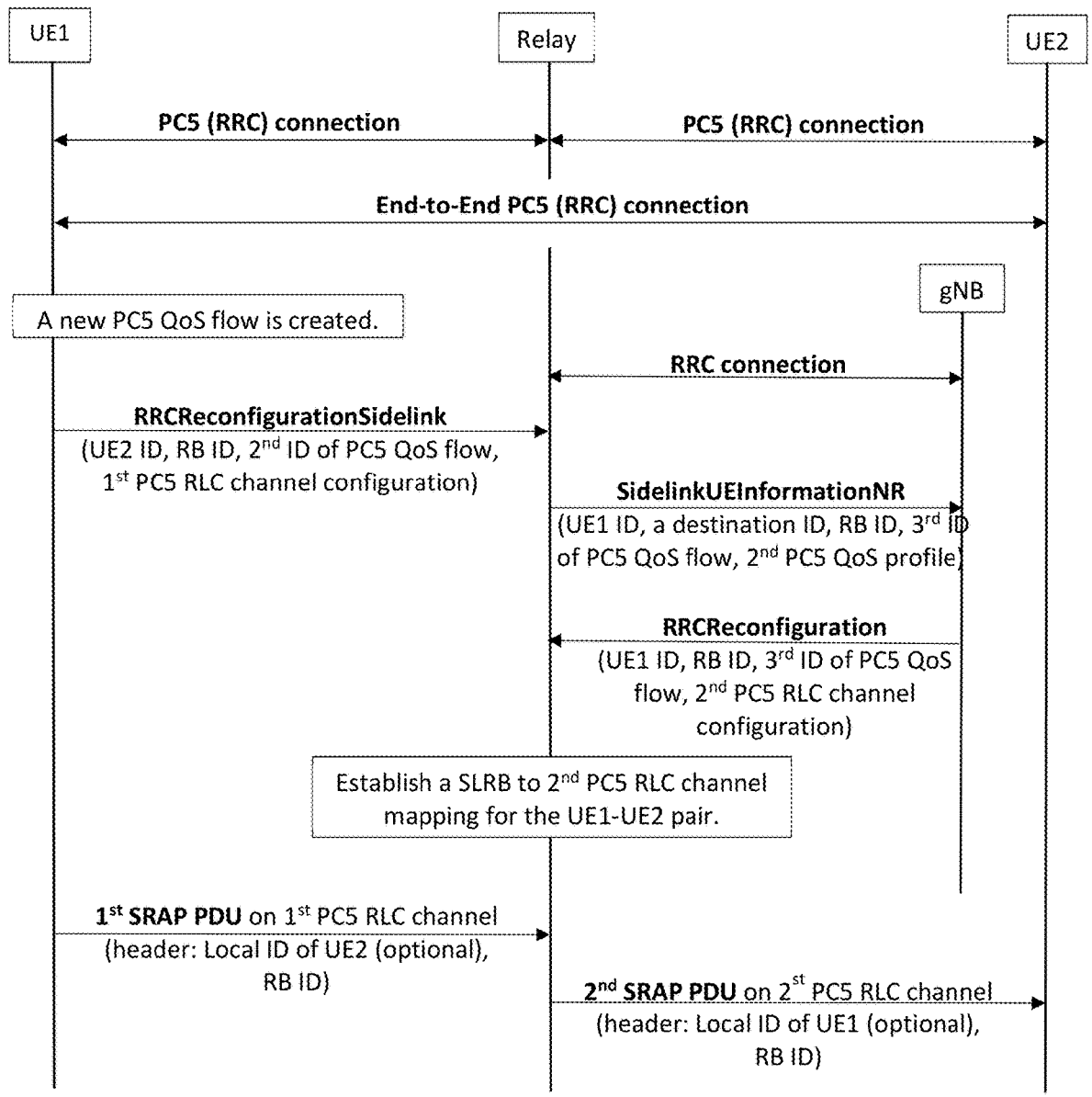
FIG. 15 illustrates sidelink UE information from the UE-to-UE Relay according to one exemplary embodiment.

FIG. 15 illustrates an example of this solution. Basically, the Source remote UE establishes a RRC connection with its serving gNB. And, the relay UE establishes one PC5 (RRC) connection (or PC5 unicast link) with each of the Source remote UE (UE1) and the Target remote UE (UE2). In addition, an end-to-end (E2E) PC5 connection between UE1 and UE2 may be established. After a new PC5 QoS flow is created, UE1 may transmits a RRC Reconfiguration Sidelink message to configure the first PC5 RLC channel over the first PC5 hop for the relay UE, wherein RRC Reconfiguration Sidelink message may include a RB ID, a second ID of the PC5 QoS flow, UE2 ID, and/or a configuration of the first RLC channel. After receiving the RRC Reconfiguration Sidelink message from UE1 to configure the first PC5 RLC channel over the first PC5 hop, the UE-to-UE relay may send a Sidelink UE Information message to its serving gNB, wherein the Sidelink UE Information message may include a destination ID of UE2, a third ID of the PC5 QoS flow (e.g. sl-QoS-FlowIdentity), a second PC5 QoS profile of the PC5 QoS flow, and/or a UE1 ID. The gNB may reply with a RRC Reconfiguration message, which may include a RB ID, the third ID of PC5 QoS flow, the UE1 ID, a configuration of a second PC5 RLC channel. Preferably, the UE1 ID may be a L2 ID or a local ID of the Source remote UE. After receiving RRC Reconfiguration message from gNB, the UE-to-UE relay may establish a SLRB to second PC5 RLC channel mapping for the UE1-UE2 pair. Packet data transfer between UE1 and UE2 may then proceed via the UE-to-UE relay.

Figure 16:
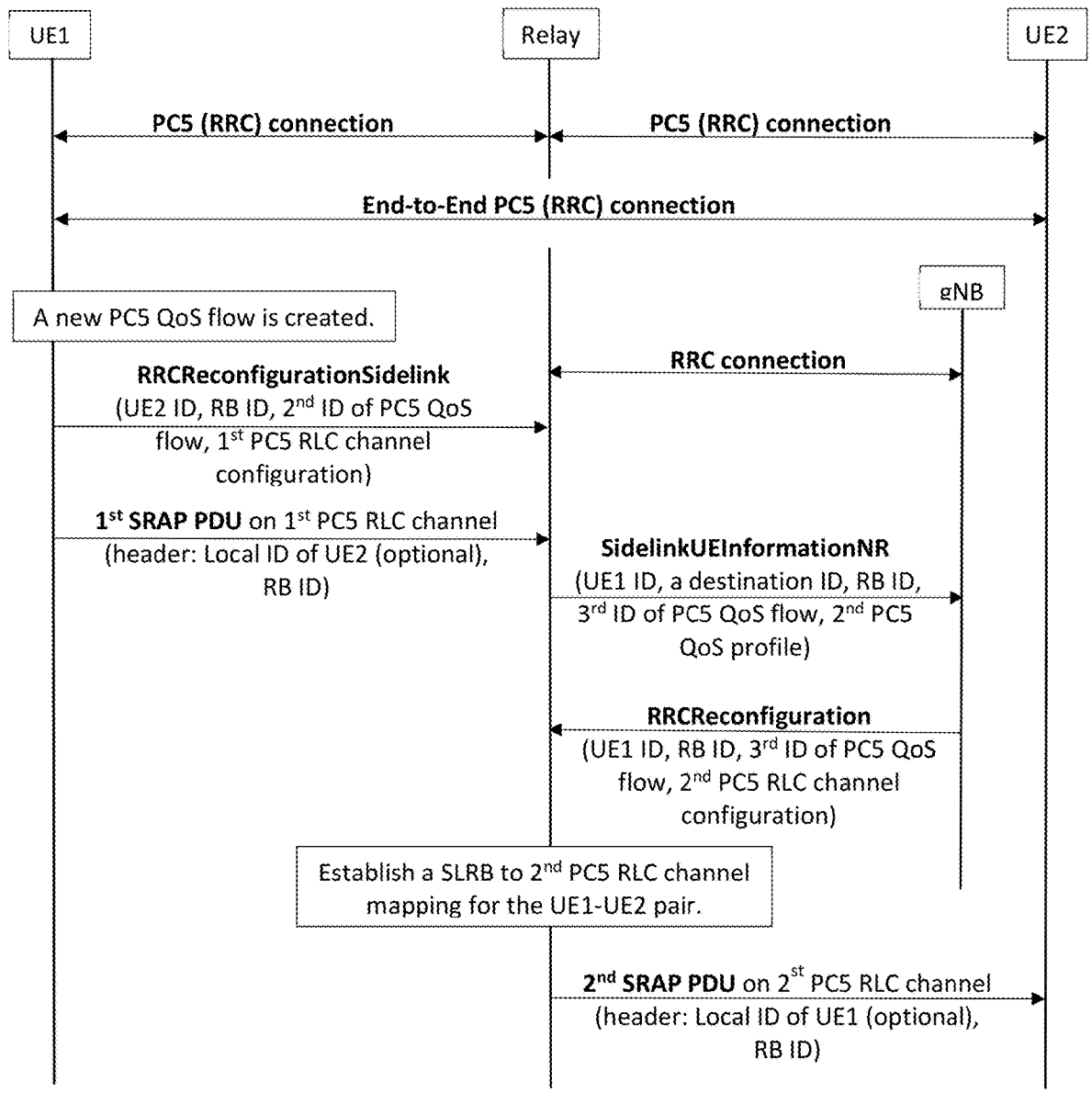
FIG. 16 illustrates an alternative sidelink UE information from the UE-to-UE Relay according to one exemplary embodiment.

It is also possible for the UE-to-UE relay to send the Sidelink UE Information message to request a configuration after receiving a SRAP PDU from the Source remote UE on the first PC5 RLC channel over the first PC5 hop. The related procedure is illustrated in FIG. 16.

Figure 17:
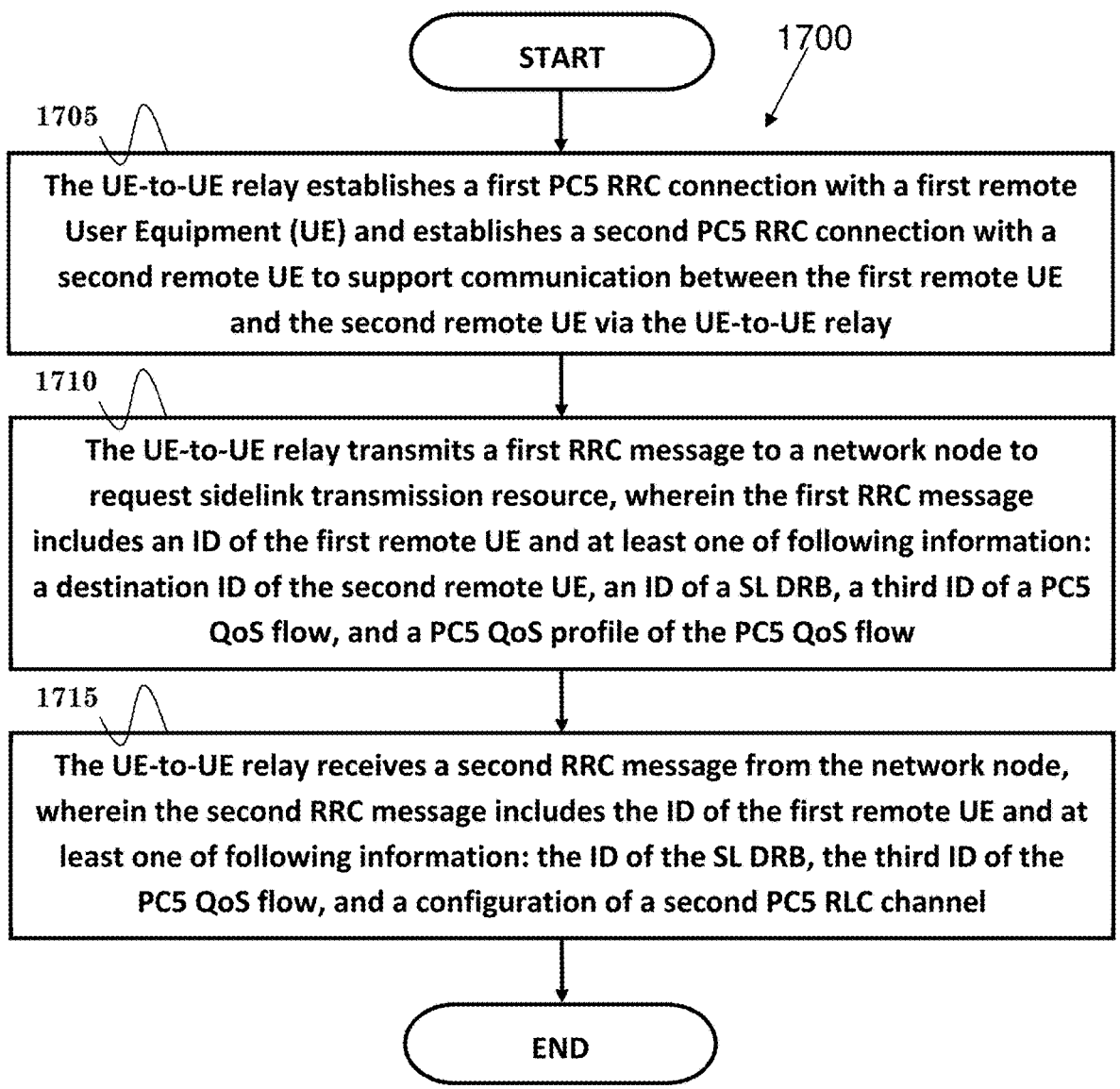
FIG. 17 is a flow chart according to one exemplary embodiment.

FIG. 17 is a flow chart 1700 of a method for a UE-to-UE relay. In step 1705, the UE-to-UE relay establishes a first PC5 Radio Resource Control (RRC) connection with a first remote User Equipment (UE) and establishes a second PC5 RRC connection with a second remote UE to support communication between the first remote UE and the second remote UE via the UE-to-UE relay. In step 1710, the UE-to-UE relay transmits a first RRC message to a network node to request sidelink transmission resource, wherein the first RRC message includes an identity (ID) of the first remote UE and at least one of following information: a destination ID of the second remote UE, an ID of a Sidelink (SL) Data Radio Bearer (DRB), a third ID of a PC5 quality of service (QoS) flow, and a PC5 QoS profile of the PC5 QoS flow. In step 1715, the UE-to-UE relay receives a second RRC message from the network node, wherein the second RRC message includes the ID of the first remote UE and at least one of following information: the ID of the SL DRB, the third ID of the PC5 QoS flow, and a configuration of a second PC5 Radio Link Control (RLC) channel.

In one embodiment, the UE-to-UE relay could receive a PC5 RRC message from the first remote UE, wherein the PC5 RRC message includes the ID of the second remote UE and at least one of following information: the ID of the SL DRB, a second ID of the PC5 QoS flow, and a configuration of a first PC5 RLC channel. The UE-to-UE relay could establish a SL DRB to PC5 RLC channel mapping based on at least the ID of the SL DRB and an ID of the second PC5 RLC channel included in the second RRC message.

In one embodiment, the UE-to-UE relay could receive a first adaptation layer protocol data unit (PDU) from the first remote UE on the first PC5 RLC channel, wherein the first adaptation layer PDU includes a data packet and a first header and wherein the first header includes the ID of the SL DRB and a local ID of the second remote UE. The UE-to-UE relay could transmit a second adaptation layer PDU to the second remote UE on the second PC5 RLC channel, wherein the second adaptation layer PDU includes the data packet and a second header and wherein the second header includes the ID of the SL DRB and a local ID of the first remote UE.

In one embodiment, the SL DRB may be an end-to-end SLRB between the first remote UE and the second remote UE. The he ID of the first remote UE may be a Layer-2 ID or the local ID of the first remote UE. The destination ID of the second remote UE may be a Layer-2 ID or the local ID of the second remote UE.

In one embodiment, the first RRC message may be a Sidelink UE Information message. The second RRC message may be a RRC Reconfiguration message. The PC5 RRC message may be a RRC Reconfiguration Sidelink message.

Referring back to FIGS. 3 and 4, in one exemplary embodiment of a UE-to-UE relay, the UE-to-UE relay 300 includes a program code 312 stored in the memory 310. The CPU 308 could execute program code 312 to enable the UE-to-UE relay (i) to establish a first PC5 RRC connection with a first remote UE and establishes a second PC5 RRC connection with a second remote UE to support communication between the first remote UE and the second remote UE via the UE-to-UE relay, (ii) to transmits a first RRC message to a network node to request sidelink transmission resource, wherein the first RRC message includes an ID of the first remote UE and at least one of following information: a destination ID of the second remote UE, an ID of a SL DRB, a third ID of a PC5 QoS flow, and a PC5 QoS profile of the PC5 QoS flow, and (iii) to receive a second RRC message from the network node, wherein the second RRC message includes the ID of the first remote UE and at least one of following information: the ID of the SL DRB, the third ID of the PC5 QoS flow, and a configuration of a second PC5 RLC channel. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE-to-UE relay, comprising:
   the UE-to-UE relay establishes a first PC5 Radio Resource Control (RRC) connection with a first remote User Equipment (UE) and establishes a second PC5 RRC connection with a second remote UE to support communication between the first remote UE and the second remote UE via the UE-to-UE relay;
   the UE-to-UE relay transmits a Sidelink UE Information message to a network node to request sidelink transmission resource, wherein the Sidelink UE Information message includes an identity (ID) of the first remote UE, a destination ID of the second remote UE, and an ID of a Sidelink (SL) Data Radio Bearer (DRB); and
   the UE-to-UE relay receives a RRC Reconfiguration message from the network node, wherein the RRC Reconfiguration message includes the ID of the first remote UE, the ID of the SL DRB, and a configuration of a second PC5 Radio Link Control (RLC) channel.

2. The method of claim 1, further comprising:
   the UE-to-UE relay receives a PC5 RRC message from the first remote UE, wherein the PC5 RRC message includes an ID of the second remote UE and at least one of following information: the ID of the SL DRB, a second ID of the PC5 QoS flow, and a configuration of a first PC5 RLC channel.

3. The method of claim 2, wherein the PC5 RRC message is a RRC Reconfiguration Sidelink message.

4. The method of claim 1, further comprising:
   the UE-to-UE relay establishes a SL DRB to PC5 RLC channel mapping based on at least the ID of the SL DRB and an ID of the second PC5 RLC channel included in the second RRC message.

5. The method of claim 1, further comprising:
   the UE-to-UE relay receives a first adaptation layer protocol data unit (PDU) from the first remote UE on the first PC5 RLC channel, wherein the first adaptation layer PDU includes a data packet and a first header and wherein the first header includes the ID of the SL DRB and a local ID of the second remote UE; and
   the UE-to-UE relay transmits a second adaptation layer PDU to the second remote UE on the second PC5 RLC channel, wherein the second adaptation layer PDU includes the data packet and a second header and wherein the second header includes the ID of the SL DRB and a local ID of the first remote UE.

6. The method of claim 1, wherein the SL DRB is an end-to-end SLRB between the first remote UE and the second remote UE.

7. The method of claim 1, wherein the ID of the first remote UE is a Layer-2 ID or the local ID of the first remote UE.

8. The method of claim 1, wherein the destination ID or the ID of the second remote UE is a Layer-2 ID or the local ID of the second remote UE.

9. A UE-to-UE relay, comprising:
   a control circuit;
   a processor installed in the control circuit; and
   a memory installed in the control circuit and operatively coupled to the processor;
   wherein the processor is configured to execute a program code stored in the memory to:
      establish a first PC5 Radio Resource Control (RRC) connection with a first remote User Equipment (UE) and establishes a second PC5 RRC connection with a second remote UE to support communication between the first remote UE and the second remote UE via the UE-to-UE relay;

transmit Sidelink UE Information message to a network node to request sidelink transmission resource, wherein the Sidelink UE Information message includes an identity (ID) of the first remote UE, a destination ID of the second remote UE, and an ID of a Sidelink (SL) Data Radio Bearer (DRB); and receive a RRC Reconfiguration message from the network node, wherein the RRC Reconfiguration message includes the ID of the first remote UE, the ID of the SL DRB, and a configuration of a second PC5 Radio Link Control (RLC) channel.

10. The UE-to-UE relay of claim 9, wherein the processor is further configured to execute a program code stored in the memory to:

receive a PC5 RRC message from the first remote UE, wherein the PC5 RRC message includes an ID of the second remote UE and at least one of following information: the ID of the SL DRB, a second ID of the PC5 QoS flow, and a configuration of a first PC5 RLC channel.

11. The UE-to-UE relay of claim 10, wherein the PC5 RRC message is a RRC Reconfiguration Sidelink message.

12. The UE-to-UE relay of claim 9, wherein the processor is further configured to execute a program code stored in the memory to:

establish a SL DRB to PC5 RLC channel mapping based on at least the ID of the SL DRB and an ID of the second PC5 RLC channel included in the second RRC message.

13. The UE-to-UE relay of claim 9, wherein the processor is further configured to execute a program code stored in the memory to:

receive a first adaptation layer protocol data unit (PDU) from the first remote UE on the first PC5 RLC channel, wherein the first adaptation layer PDU includes a data packet and a first header and wherein the first header includes the ID of the SL DRB and a local ID of the second remote UE; and transmit a second adaptation layer PDU to the second remote UE on the second PC5 RLC channel, wherein the second adaptation layer PDU includes the data packet and a second header and wherein the second header includes the ID of the SL DRB and a local ID of the first remote UE.

14. The UE-to-UE relay of claim 9, wherein the SL DRB is an end-to-end SLRB between the first remote UE and the second remote UE.

15. The UE-to-UE relay of claim 9, wherein the ID of the first remote UE is a Layer-2 ID or the local ID of the first remote UE.

16. The UE-to-UE relay of claim 9, wherein the destination ID or the ID of the second remote UE is a Layer-2 ID or the local ID of the second remote UE.

* * * * *